(12) United States Patent
Bisson

(10) Patent No.: US 10,933,501 B2
(45) Date of Patent: Mar. 2, 2021

(54) QUICK CHANGE MODULAR GAUGE

(71) Applicant: NYX, Inc., Livonia, MI (US)

(72) Inventor: Jeffrey Michael Bisson, Amherstburg (CA)

(73) Assignee: NYX, Inc., Livonia, MI (US)

( * ) Notice: Subject to any disclaimer, the term of this patent is extended or adjusted under 35 U.S.C. 154(b) by 217 days.

(21) Appl. No.: 16/162,899

(22) Filed: Oct. 17, 2018

(65) Prior Publication Data

US 2019/0111533 A1   Apr. 18, 2019

Related U.S. Application Data

(60) Provisional application No. 62/573,923, filed on Oct. 18, 2017.

(51) Int. Cl.

| | | |
|---|---|---|
| *B23Q 15/06* | (2006.01) | |
| *G01B 5/00* | (2006.01) | |
| *F16B 21/07* | (2006.01) | |
| *B23Q 3/18* | (2006.01) | |
| *F16B 21/09* | (2006.01) | |
| *F16M 11/04* | (2006.01) | |
| *F16B 2/14* | (2006.01) | |

(52) U.S. Cl.
CPC ............ *B23Q 15/06* (2013.01); *B23Q 3/18* (2013.01); *F16B 2/14* (2013.01); *F16B 21/071* (2013.01); *F16B 21/09* (2013.01); *F16M 11/041* (2013.01); *G01B 5/0004* (2013.01); *F16M 2200/024* (2013.01)

(58) Field of Classification Search
CPC ..... B23Q 15/06; G01B 5/0004; G01B 5/0002
USPC ............. 33/568, 1 BB, 549, 573; 269/9, 46; 248/231.31, 339
See application file for complete search history.

(56) References Cited

U.S. PATENT DOCUMENTS

| | | | | | |
|---|---|---|---|---|---|
| 2,271,928 | A | * | 2/1942 | Sims | A47G 25/0635 248/224.8 |
| 2,345,312 | A | * | 3/1944 | Sorensen | 33/537 |
| 2,963,946 | A | * | 12/1960 | Muench | B23Q 1/525 269/82 |
| 3,537,697 | A | * | 11/1970 | Davis | B23Q 3/106 269/50 |
| 4,817,809 | A | * | 4/1989 | Rozmestor | B25B 13/56 206/503 |
| 4,968,012 | A | * | 11/1990 | Haddad | B23Q 3/103 269/88 |
| 5,107,599 | A | * | 4/1992 | Marincic | G01B 5/0004 269/309 |
| 5,244,300 | A | * | 9/1993 | Perreira | E04B 1/2403 403/381 |
| 5,481,811 | A | * | 1/1996 | Smith | B23Q 3/103 269/88 |

(Continued)

*Primary Examiner* — Christopher W Fulton
(74) *Attorney, Agent, or Firm* — Carlson, Gaskey & Olds, P.C.

(57) ABSTRACT

A gauging station includes a substrate plate and a fixture plate secured on the substrate plate. The fixture plate has a first mounting member. A gauging fixture has a second mounting member that is interlockable with the first mounting member to secure the gauging fixture on the fixture plate. One of the first mounting member or the second mounting member is a male wedge, and the other of the first mounting member or the second mounting member is a female wedge slot that is complementary to the male wedge.

16 Claims, 6 Drawing Sheets

(56) References Cited

U.S. PATENT DOCUMENTS

| | | | | |
|---|---|---|---|---|
| 5,829,151 A | * | 11/1998 | Collier | B23Q 7/14 |
| | | | | 33/573 |
| 6,298,572 B1 | * | 10/2001 | McAuley | G01B 5/0002 |
| | | | | 269/37 |
| 8,621,761 B2 | * | 1/2014 | Boyer | G01B 3/14 |
| | | | | 33/552 |
| 2003/0005594 A1 | * | 1/2003 | Recupero | G01B 21/042 |
| | | | | 33/549 |

* cited by examiner

QUICK CHANGE MODULAR GAUGE

CROSS-REFERENCE TO RELATED APPLICATION

The present disclosure claims benefit of U.S. Provisional Application No. 62/573,923 filed Oct. 18, 2017.

BACKGROUND

In manufacturing settings the components that are being produced on an assembly line are often spot tested to ensure that they meet applicable performance or dimensional requirements. As an example, a component may be tested at a gauging station that is set up to check one or more of the performance or dimensional requirements. The gauging station typically includes one or more fixtures in which the component is mounted. The fixtures are intended to mount the component in a precise orientation so that accurate performance or dimensional measurements can be taken. Disadvantageously, there can be play in the fixtures due to tolerances in fabrication of the fixture and gauging station, which can lead to less reliable measurements of the component. Additionally, a different gauging station is typically needed for each different component, resulting in the need for multiple gauging stations which take up space in the manufacturing setting.

SUMMARY

A gauging station according to an example of the present disclosure includes a substrate plate, and a fixture plate secured on the substrate plate. The fixture plate has a first mounting member, and a gauging fixture that has a second mounting member that is interlockable with the first mounting member to secure the gauging fixture on the fixture plate. One of the first mounting member or the second mounting member is a male wedge and the other of the first mounting member or the second mounting member is a female wedge slot that is complementary to the male wedge.

In a further embodiment of any of the foregoing embodiments, the male wedge includes a wedge face, first and second wedge sides oriented at an acute angle to each other, and a leading wedge side joining the first and second wedge sides.

In a further embodiment of any of the foregoing embodiments, the first and second wedge sides are oriented at an oblique angle to the wedge face.

In a further embodiment of any of the foregoing embodiments, the first and second wedge sides include bearing pads.

In a further embodiment of any of the foregoing embodiments, the male wedge is on a base surface located opposite the wedge face. There are first and second elongated slots. The first elongated slot extends along a first corner between the base surface and the first wedge side and the second elongated slot extends along a second corner between the base surface and the second wedge side.

In a further embodiment of any of the foregoing embodiments, the leading wedge side is perpendicular to the wedge face.

In a further embodiment of any of the foregoing embodiments, the gauging fixture includes a threaded fastener locking the gauging fixture on the fixture plate.

In a further embodiment of any of the foregoing embodiments, the fixture plate includes a slot having a bearing surface. The threaded fastener is disposed in the slot and bearing against the bearing surface.

In a further embodiment of any of the foregoing embodiments, the female wedge slot includes a first and second slot sides oriented at an acute angle to each other and a leading slot side joining the first and second slot sides.

In a further embodiment of any of the foregoing embodiments, the male wedge includes a wedge face, first and second wedge sides oriented at an acute angle to each other, and a leading wedge side joining the first and second wedge sides. The first and second wedge sides bear against, respectively, the first and second slot sides.

In a further embodiment of any of the foregoing embodiments, the first and second wedge sides are oriented at an oblique angle to the wedge face.

In a further embodiment of any of the foregoing embodiments, the first and second wedge sides include bearing pads.

In a further embodiment of any of the foregoing embodiments, the male wedge is on a base surface located opposite the wedge face. There are first and second elongated slots. The first elongated slot extends along a first corner between the base surface and the first wedge side and the second elongated slot extends along a second corner between the base surface and the second wedge side.

In a further embodiment of any of the foregoing embodiments, the leading wedge side bears against the leading slot side.

In a further embodiment of any of the foregoing embodiments, the male wedge has a trapezoidal cross-section.

A gauging station according to an example of the present disclosure includes a substrate plate, and a plurality of fixture plates secured on the substrate plate. Each said fixture plate has a first mounting member. A plurality of gauging fixtures has a second mounting member that is interlockable with each of the first mounting member to secure the gauging fixture on the fixture plate. One of the first mounting member or the second mounting member is a male wedge and the other of the first mounting member or the second mounting member is a female wedge slot that is complementary to the male wedge.

In a further embodiment of any of the foregoing embodiments, the male wedge includes a wedge face, first and second wedge sides oriented at an acute angle to each other, and a leading wedge side joining the first and second wedge sides. The first and second wedge sides bear against, respectively, the first and second slot sides.

In a further embodiment of any of the foregoing embodiments, the first and second wedge sides are oriented at an oblique angle to the wedge face.

In a further embodiment of any of the foregoing embodiments, the male wedge is on a base surface located opposite the wedge face. There are first and second elongated slots. The first elongated slot extends along a first corner between the base surface and the first wedge side and the second elongated slot extends along a second corner between the base surface and the second wedge side.

In a further embodiment of any of the foregoing embodiments, the leading wedge side bears against the leading slot side.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
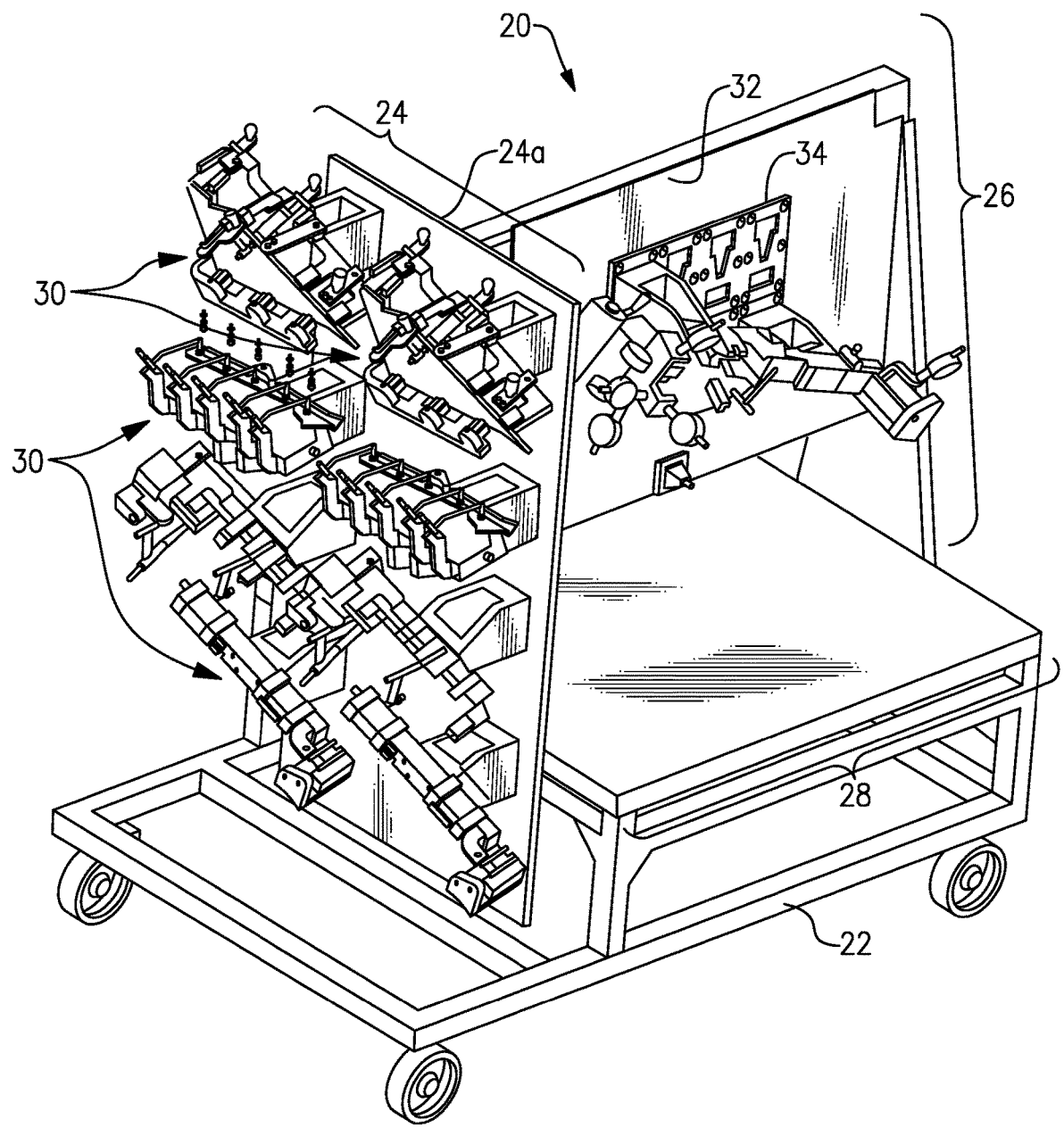
FIG. 1 illustrates an example gauging station.

FIG. 1 schematically illustrates a quick-change modular gauging station 20 (hereafter "station 20"). It is to be appreciated that the features disclosed herein are to demonstrate various example implementations of the station 20 and are not intended to be limiting. Moreover, it will also be appreciated that not all of the features disclosed are necessary in any particular implementation and that this disclosure also contemplates exclusion of features as well as combinations of any of the features.

In the example implementation shown in FIG. 1, the station 20 is constructed on a mobile wheeled rack 22 that permits the station 20 to be moved from location-to-location. The rack 22 supports a storage section 24, a gauging section 26, and a work table 28. The storage section 24 includes a wall 24a that is configured to support a plurality of gauging fixtures 30. In this regard, the wall 24a may include holes, hooks, fasteners, or the like that are adapted to temporarily hold the gauging fixtures 30. The gauging fixtures 30 may be removed from the wall 24a by an operator for use on the gauging section 26 and then returned to the storage section 24 when not in use on the gauging section 26.

The gauging fixtures 30 may be secured on the gauging section 26. The gauging fixtures 30 serve as mounts for manufactured components for the purpose of testing the manufactured component, such as to run performance or dimensional checks on the manufactured component. In this regard, each gauging fixture 30 (or set of complementary gauging fixtures 30) may be configured for a unique manufactured component. As an example, each gauging fixture may include one or more unique geometries, sizes, measurement gauges, measurement gauge adapters, or the like that correspond to a particular manufactured component design.

Figure 2:
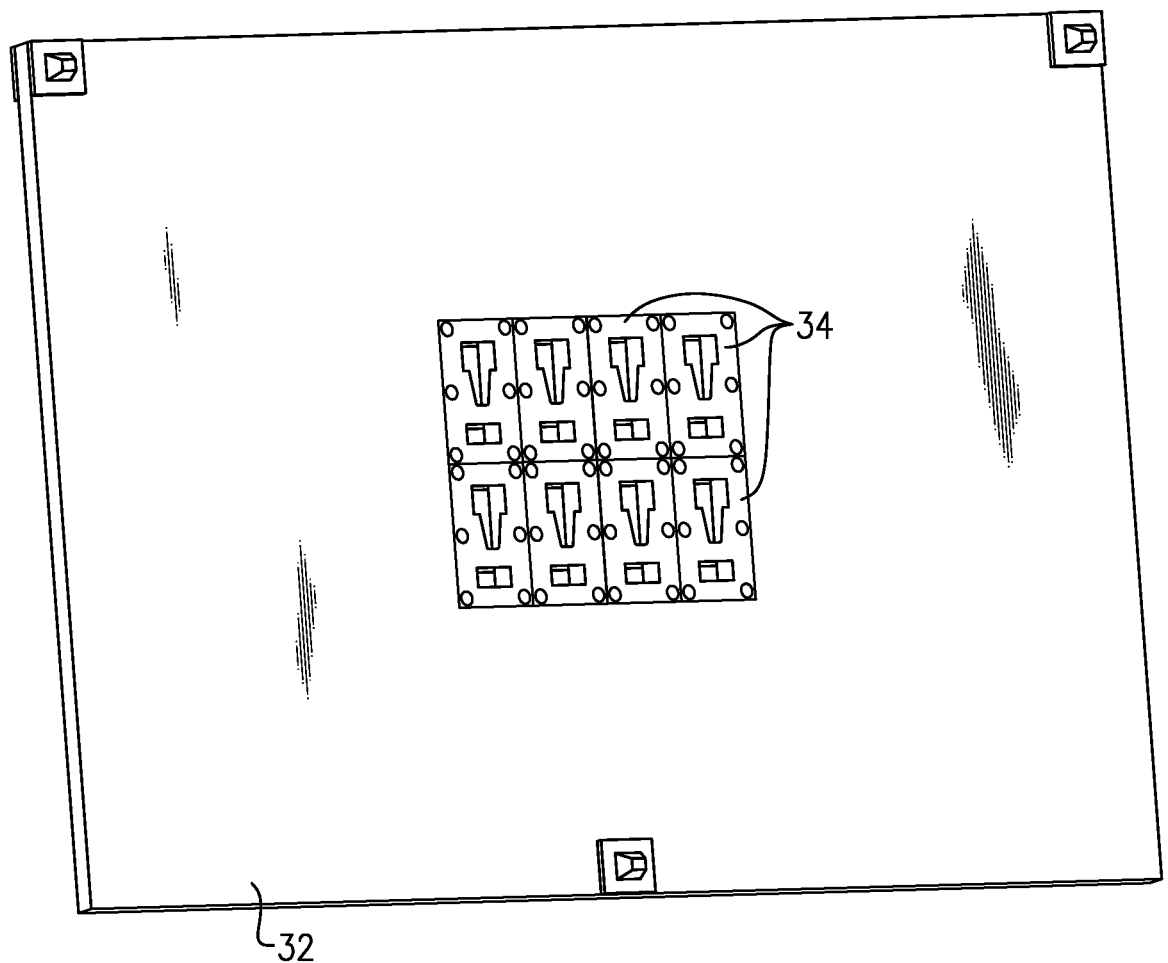
FIG. 2 illustrates an isolated view of a substrate plate of the gauging station.

The station 20 is modular in that the gauging fixtures 30 can all be used on and secured to the gauging section 26, thus eliminating the need for multiple stations that are each unique to a different unique manufactured component. The station 20 thereby saves space. The gauging section 26 of the station 20, which is also shown in an isolated view in FIG. 2, includes a substrate plate 32 and at least one fixture plate 34 secured on the substrate plate 32. Most typically, as shown, there will be an array of fixture plates 34 on the substrate plate 32; however, use of only a single fixture plate 34 is also contemplated. The configuration of the array of fixture plates 34 may be selected with regard to the types and sizes of the gauging fixtures and manufactured components that are to be tested in the gauging section 26. It is to be further noted that, although only one side of the substrate plate 32 is shown, that the opposite side of the substrate plate 32 may also include one or more fixture plates 34 in the same or different array configuration (or singly).

Figure 3:
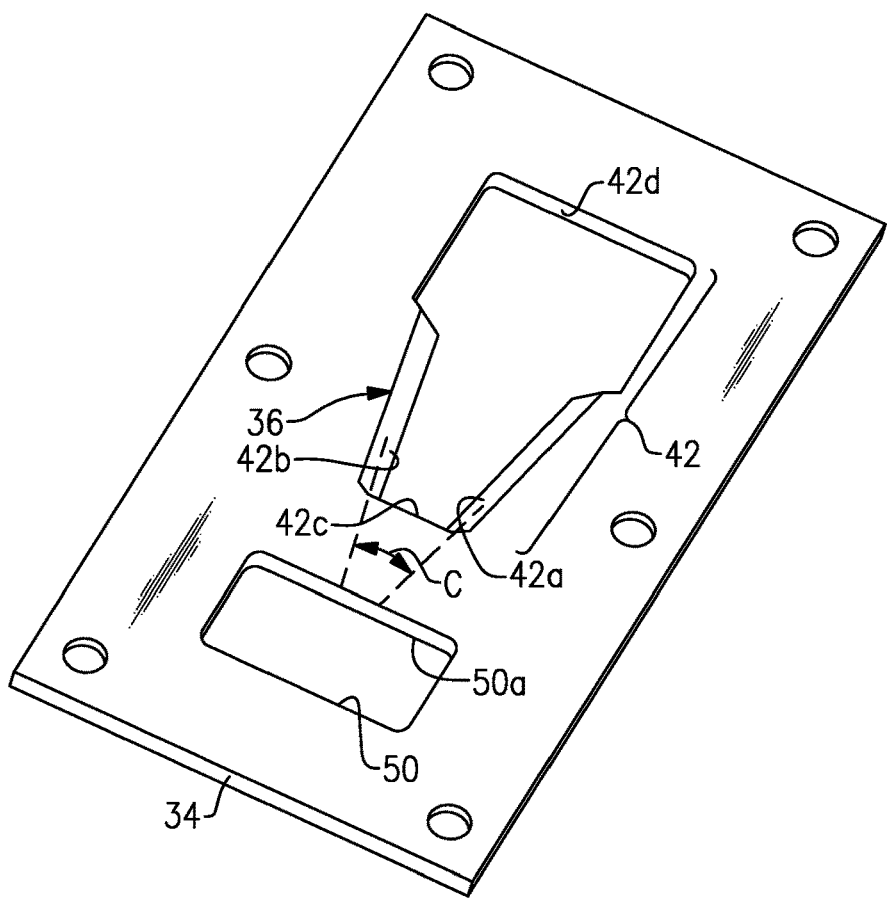
FIG. 3 illustrates an isolated view of a fixture plate of the gauging station.
Figure 4:
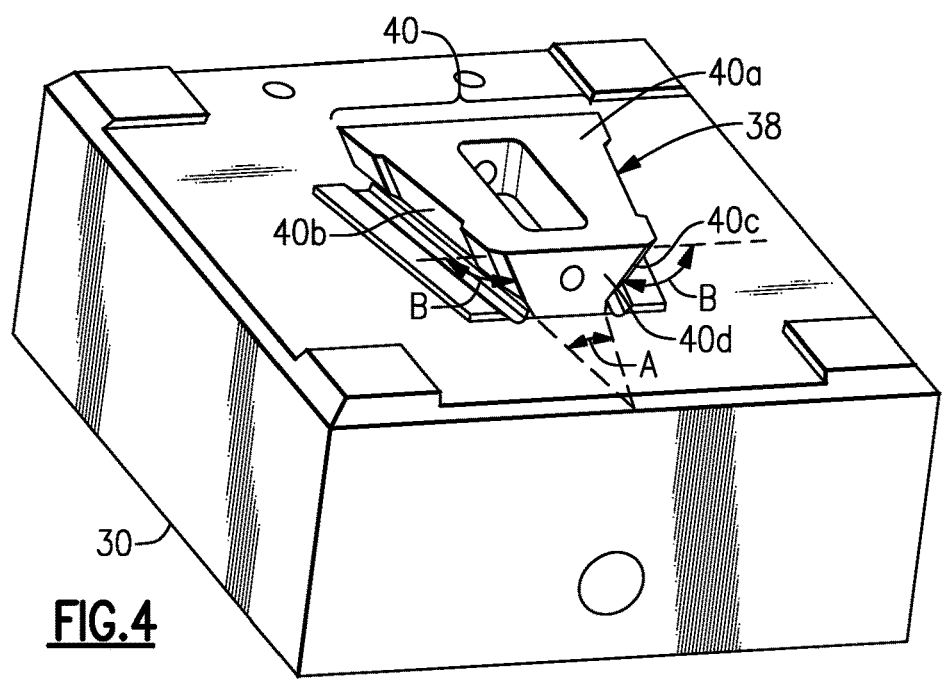
FIG. 4 illustrates an isolated view of a gauging fixture of the gauging station.
Figure 5:
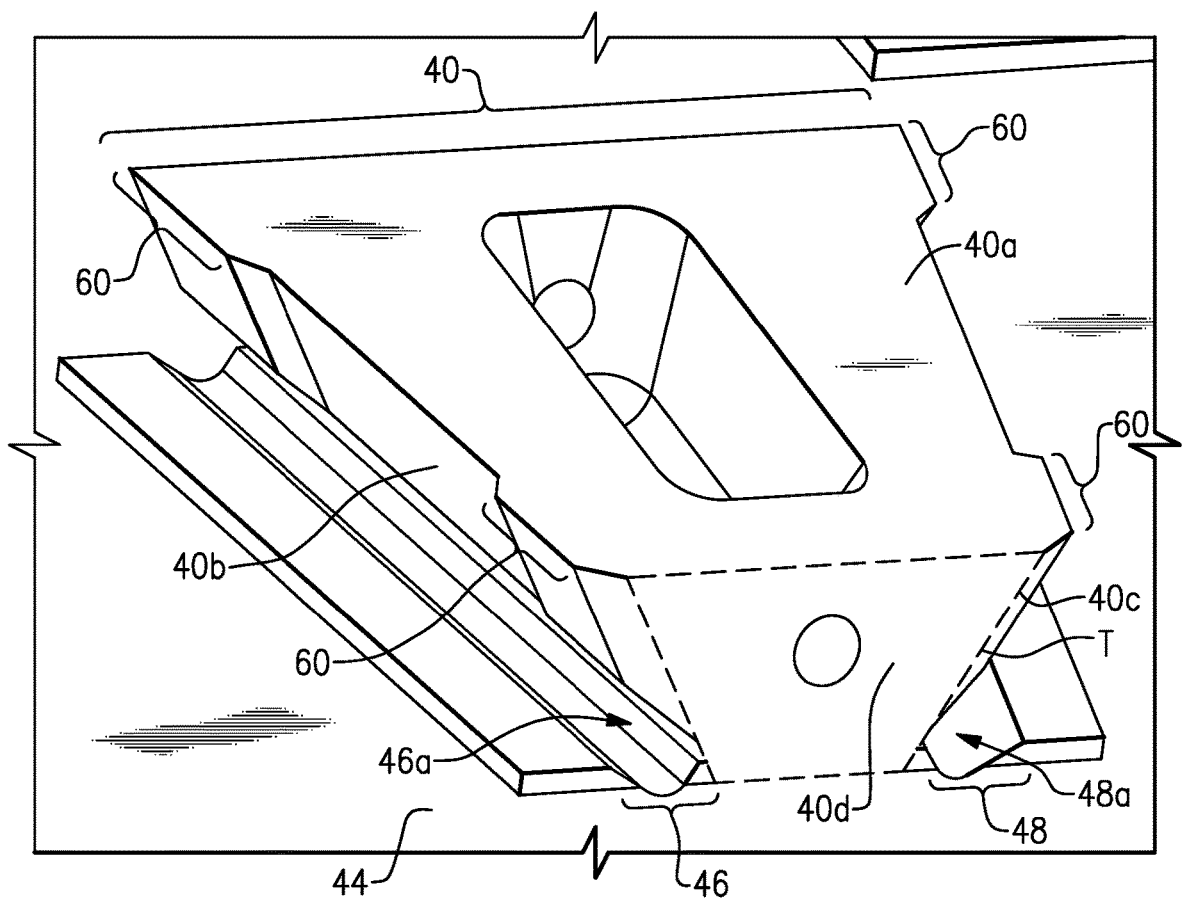
FIG. 5 illustrates a magnified view of a male wedge of a gauging fixture.

A representative example of one of the fixture plates 34 is shown in FIG. 3 and a representative portion of one of the gauging fixtures 30 is shown in FIG. 4 and in a magnified view in FIG. 5. The gauging fixture 30 is removably securable to the fixture plate 34. In this regard, the fixture plate 34 has a first mounting member 36 and the gauging fixture 30 has a second mounting member 38 that is interlockable with the first mounting member 36 to secure the gauging fixture 30 on the fixture plate 34 (shown in FIG. 1).

In this example, the second mounting member 38 is a male wedge 40 on the gauging fixture 30 and the first mounting member 36 is a female wedge slot 42 on the fixture plate 34 that is complementary to the male wedge 40. As will be appreciated, it is also contemplated that the gauging fixture 30 could alternatively have the female wedge slot 42 and the fixture plate 34 could alternatively have the male wedge 40.

The male wedge 40 includes a wedge face 40a, first and second wedge sides 40b/40c, and a leading wedge side 40d that joins the first and second wedge sides 40b/40c. The leading wedge side 40d is perpendicular to the wedge face 40a. The term "leading" as used herein refers to the end of the male wedge 40 that is first received into the female wedge slot 42 during installation.

The wedge face 40a is generally flat. The wedge sides 40b/40c are oriented at an acute angle to each other, as represented at "A" in FIG. 4. Most typically, the angle A will be in a range from 20° to 80°, and especially from 40° to 70°. The wedge sides 40b/40c are also oriented at an oblique angle to the wedge face 40a, as represented at "B." Most typically, the angle B will be in a range from 100° to 150°, and especially 110° to 125°. Accordingly, the male wedge 40 has a trapezoidal cross-sectional shape, as represented at dashed line T in FIG. 5.

The male wedge 40 is located on a base surface 44 located opposite the wedge face 40a and from which the male wedge 40 projects. For example, the base surface 44 is an adjacent surface of a block of the gauging fixture 30. In the example shown, the block and the male wedge 40 are a single, monolithic piece. Alternatively, as will be described further below, the block and male wedge 40 may be distinct separate pieces that are secured together. The gauging fixture 30 includes first and second elongated slots 46/48. The first elongated slot 46 extends along a first corner 46a between the base surface 44 and the first wedge side 40b, and the second elongated slot 48 extends along a second corner 48a between the base surface 44 and the second wedge side 40c. The slots 46/48 serve as gutters to catch debris that may otherwise lodge at the sides 40b/40c or leading wedge side 40d or hinder movement.

Turning again to FIG. 3, the female wedge slot 42 includes first and second slot sides 42a/42b and a leading slot side 42c that joins the first and second slot sides 40a/40b. There is a keyhole portion 42d at the head of slot sides 42a/42b, which serves for receiving the male wedge 40. The slot sides 42a/42b are oriented at an acute angle to each other, as represented by angle "C." Generally, the orientation of the slot sides 42a/42b is complementary to the orientation of the wedge sides 40b/40c such that the angle C is equal to angle A. The fixture plate 34 further includes a slot 50 that has a bearing surface 50a, the function of which will be described further below.

Figure 6:
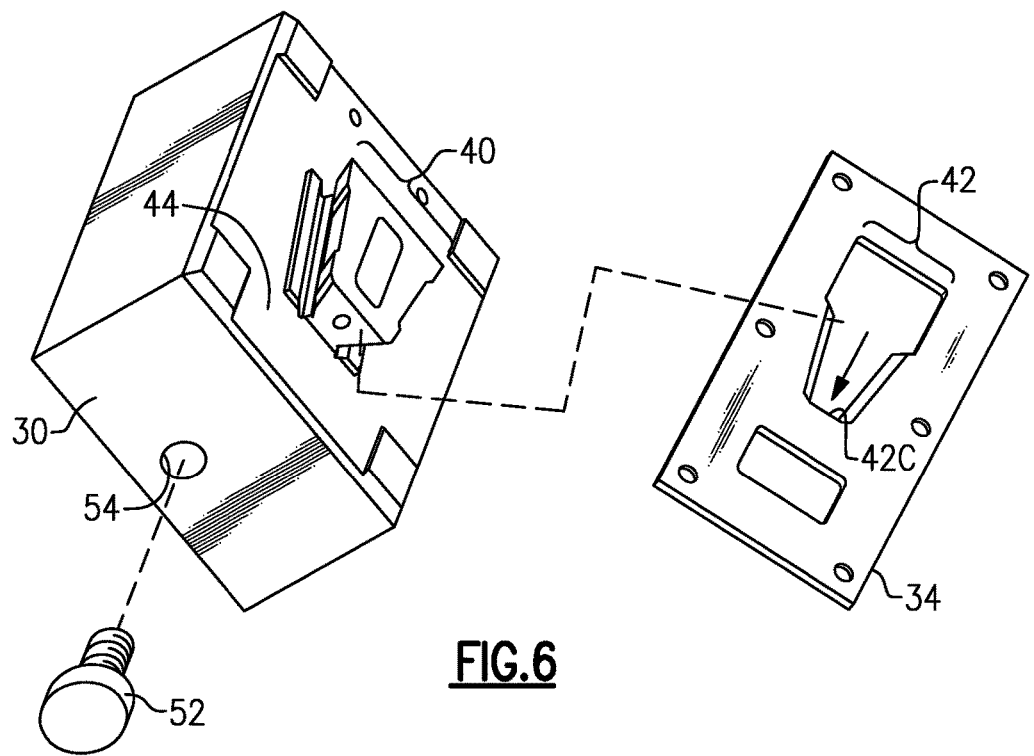
FIG. 6 depicts installation of a male wedge and a female wedge slot.
Figure 7:
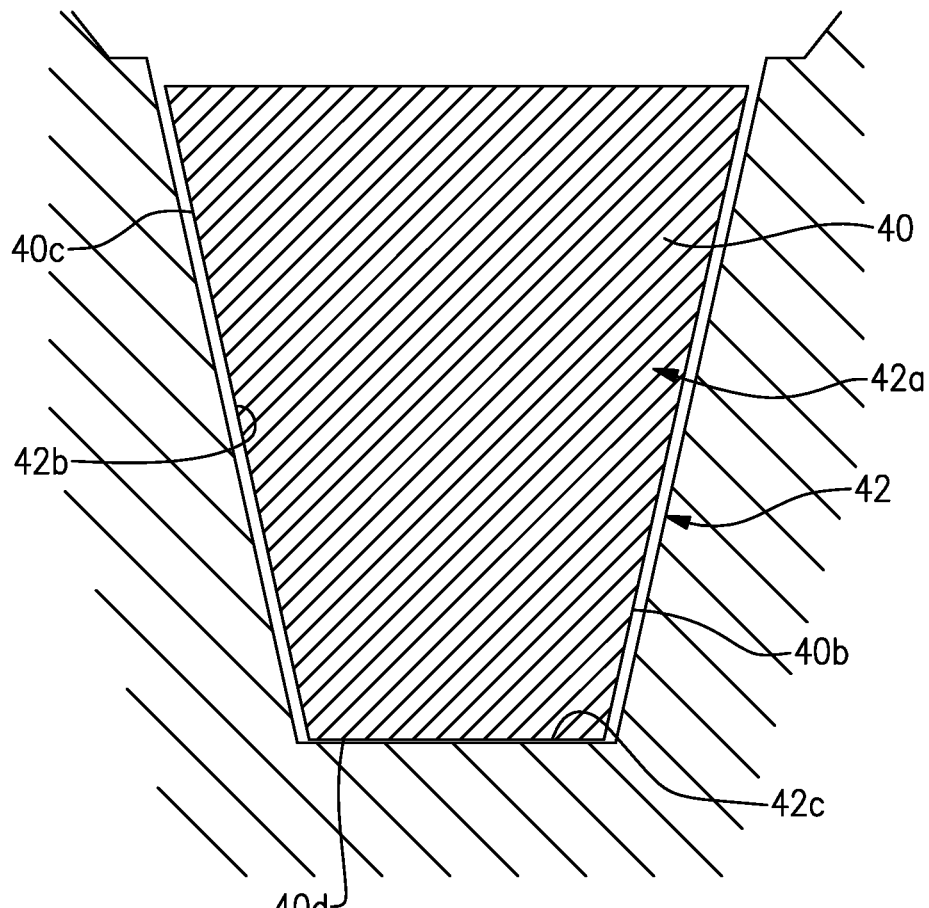
FIG. 7 illustrates a sectioned view of a male wedge in a female wedge slot.

During installation to secure the gauging fixture 30 to the substrate plate 32, the male wedge 40 is received into the female wedge slot 42 of the fixture plate 34, as depicted in FIG. 6. For instance, initially, the male wedge 40 is inserted into the keyhole portion 42d toward the top of the female wedge slot 42. The male wedge 40 may be inserted such that the base surface 44 meets the front face of the fixture plate. Next, the male wedge 40 is moved downwards, toward the leading slot side 42c. During this movement, the wedge sides 40b/40c slide against the slot sides 42a/42b. In this regard, the sides 40b/40c and the sides 42a/42b are bearing surfaces. The complementary wedge shape of the sides 40b/40c and the sides 42a/42b guides the gauging fixture 30 into final position in which the leading wedge side 40d bears against the leading slot side 42c, as depicted in FIG. 7. The first wedge side 40b also bears against the first slot side 42a, and the second wedge side 40c bears against the slot side 42b. At this point in the installation, the female wedge slot 42 prevents the male wedge 40 from moving any farther but also prevents the male wedge 40 from moving up/down, moving laterally, or rotating. The wedge shape enables line-to-line contact between the leading wedge side 40d and the leading slot side 42c without clearance requirements, thereby enhancing positional accuracy.

Figure 8:
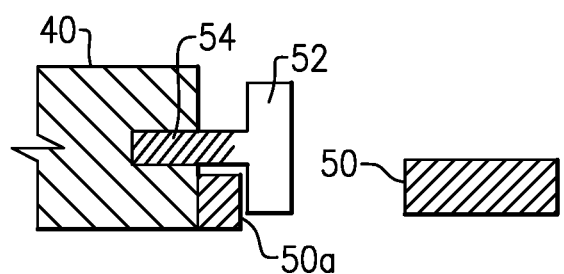
FIG. 8 illustrates a sectioned view of a male wedge secured with a fixture plate.

Once the leading wedge side 40d is seated against the leading slot side 42c, a threaded fastener 52 (FIG. 6) can be tightened into a threaded hole 54 in the male wedge 40, as also depicted in a cross-sectioned view in FIG. 8. In this example, the head of the threaded fastener 52 bears against the bearing surface 50a, thereby clamping around the edge of the slot 50 and locking the male wedge 40 in place. Once locked, the female wedge slot 40 and the threaded fastener 52 constrain movement of the gauging fixture 30 in six degrees (X, Y, Z, and rotation about each of these axes).

As will be appreciated, other types of threaded fasteners 52 may be used, such as but not limited to, a nut or thumb screw. As an example, the threaded fastener 52 may include a torque nut or torque bolt that tightens to a predetermined torque value to ensure that the gauging fixture 30 is always secured in the same position. In this manner, the gauging fixtures 30 can be secured to the substrate plate 32 at any location where there is a fixture plate 34. That is, all of the male wedges 40 on the gauging fixtures 30 are of common geometry and all of the female wedge slots are of common geometry such that each male wedge 40 fits with each female wedge slot 42. Additionally, the threaded fasteners 52 may be tightened by hand, thereby enabling more rapid exchange of gauging fixtures 30 and eliminating or minimizing the need for tools to exchange gauging fixtures 30.

The station 20 may include additional features to facilitate operation. As an example, any of the bearing surfaces described herein may include pads or other friction feature to aid in sliding movement or resist wear. As an example, as shown in FIG. 5, the wedge sides 40b/40c may include bearing pads 60. The pads 60 may be distinct pieces that are secured to the sides 40b/40c or regions that are integral with the male wedge 40. For instance, the pads 60 may be protrusions on the sides 40b/40 that have flat surfaces that act as bearing surfaces.

Figure 9:
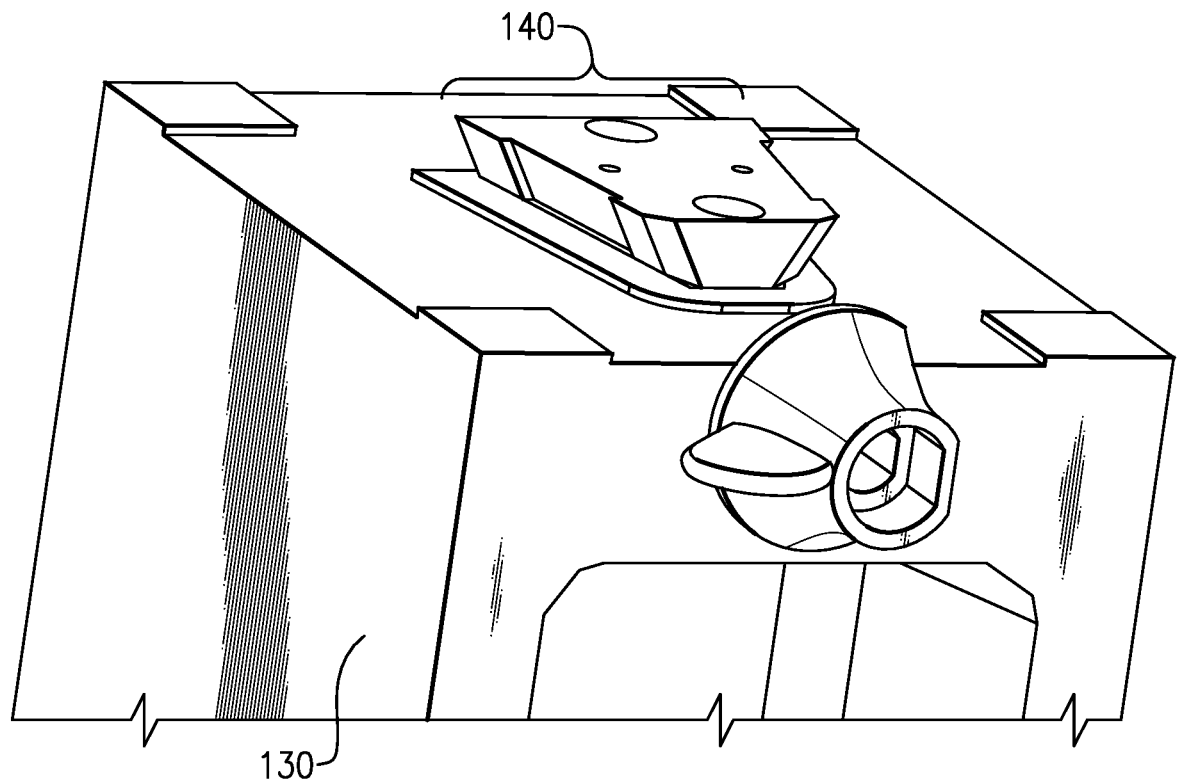
FIG. 9 illustrates another example of a gauging fixture.

FIG. 9 illustrates another example gauging fixture 130. In this disclosure, like reference numerals designate like elements where appropriate and reference numerals with the addition of one-hundred or multiples thereof designate modified elements that are understood to incorporate the same features and benefits of the corresponding elements. In this example, the male wedge 140 is a distinct piece that is secured to the remaining portion of the gauging fixture 130. For instance, the make wedge 140 may be fabricated separately from the remaining portion of the gauging fixture and then secured to the gauging fixture using fasteners or the like. The male wedge 140 and/or the remaining portion of the gauging fixture 130 may include dowels to properly locate the male wedge 140 on the gauging fixture 130 prior to fastening.

Figure 10:
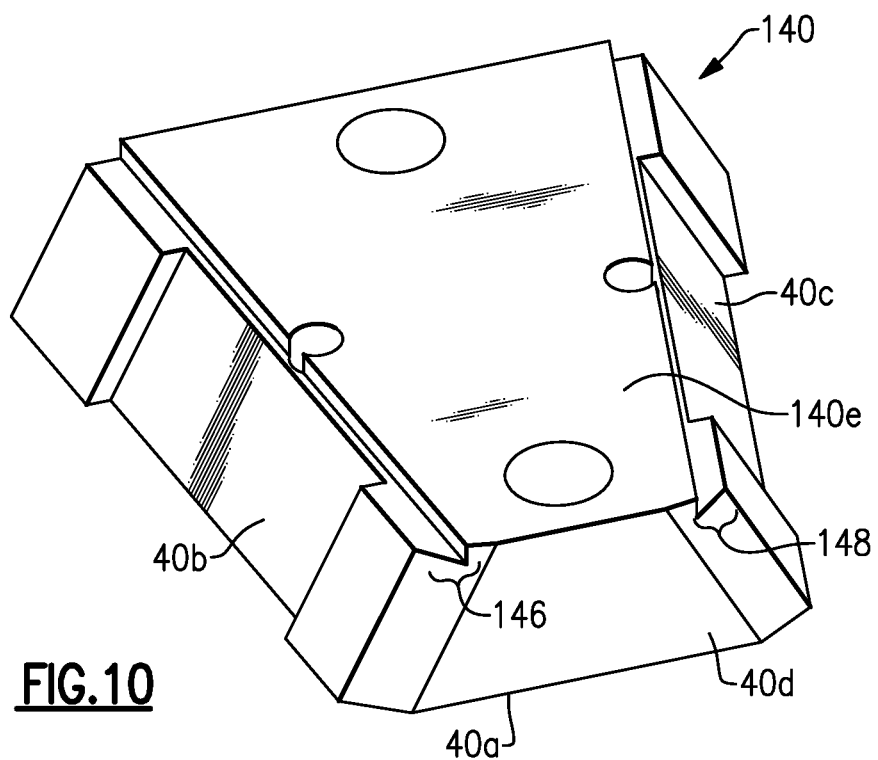
FIG. 10 illustrates an isolated view of another example male wedge.

FIG. 10 illustrates an isolated view of the male wedge 140. The male wedge 140 is substantially the same as the male wedge 40 described above. However, since the male wedge 140 is, initially, separate, it includes a back face 140e, which ultimately bears against the remaining portion of the gauging fixture 130 once the male wedge 140 is secured thereto. In this example, rather than the elongated slots 46/48 being formed adjacent the base surface 44 as in the prior examples, elongated slots 146/148 are formed at the corners between the back face 140e and the sides 40b/40c.

One or more of the gauging fixtures may be for calibration. For example, the gauging fixture 30 may include a plurality of index features, such as spheres. The index features can then be used to determine relative proximities to one or more other locations on other gauging fixtures 30 to verify calibration. Additionally, if only one gauging fixture 30 is used, the index features may be used to verify the proper positioning of the single gauging fixture 30. In either case, if there is discrepancy, an operator may then adjust the gauging fixture 30.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gauging station comprising:
   a substrate plate;
   a fixture plate secured on the substrate plate, the fixture plate having a first mounting member;
   a gauging fixture having a second mounting member that is interlockable with the first mounting member to secure the gauging fixture on the fixture plate,
   wherein one of the first mounting member or the second mounting member is a male wedge and the other of the first mounting member or the second mounting member is a female wedge slot that is complementary to the male wedge,
   the male wedge including a wedge face, first and second wedge sides oriented at an acute angle to each other, and a leading wedge side joining the first and second wedge sides,
   the first and second wedge sides being oriented at an oblique angle to the wedge face, and
   the first and second wedge sides including bearing pads.

2. The gauging station as recited in claim 1, wherein the male wedge is on a base surface located opposite the wedge face, wherein there are first and second elongated slots, the first elongated slot extending along a first corner between the base surface and the first wedge side and the second elongated slot extending along a second corner between the base surface and the second wedge side.

3. The gauging station as recited in claim 1, wherein the leading wedge side is perpendicular to the wedge face.

4. The gauging station as recited in claim 1, wherein the gauging fixture includes a threaded fastener locking the gauging fixture on the fixture plate.

5. The gauging station as recited in claim 4, wherein the fixture plate includes a slot having a bearing surface, the threaded fastener being disposed in the slot and bearing against the bearing surface.

6. The gauging station as recited in claim 1, wherein the female wedge slot includes a first and second slot sides oriented at an acute angle to each other and a leading slot side joining the first and second slot sides.

7. The gauging station as recited in claim 6, wherein the male wedge includes a wedge face, first and second wedge sides oriented at an acute angle to each other, and a leading wedge side joining the first and second wedge sides, the first and second wedge sides bearing against, respectively, the first and second slot sides.

8. The gauging station as recited in claim 7, wherein the first and second wedge sides are oriented at an oblique angle to the wedge face.

9. The gauging station as recited in claim 8, wherein the first and second wedge sides include bearing pads.

10. The gauging station as recited in claim 8, wherein the male wedge is on a base surface located opposite the wedge face, wherein there are first and second elongated slots, the first elongated slot extending along a first corner between the base surface and the first wedge side and the second elongated slot extending along a second corner between the base surface and the second wedge side.

11. The gauging station as recited in claim 8, wherein the leading wedge side bears against the leading slot side.

12. The gauging station as recited in claim 1, wherein the male wedge has a trapezoidal cross-section.

13. A gauging station comprising:
a substrate plate;
a plurality of fixture plates secured on the substrate plate, each said fixture plate having a first mounting member;
a plurality of gauging fixtures, each said gauging fixture having a second mounting member that is interlockable with each of the first mounting member to secure the gauging fixture on the fixture plate,
wherein one of the first mounting member or the second mounting member is a male wedge and the other of the first mounting member or the second mounting member is a female wedge slot that is complementary to the male wedge,
the female wedge slot including first and second slot sides oriented at an acute angle to each other and a leading slot side joining the first and second slot sides,
the male wedge including a wedge face, first and second wedge sides oriented at an acute angle to each other, and a leading wedge side joining the first and second wedge sides, the first and second wedge sides bearing against, respectively, the first and second slot sides,
the first and second wedge sides being oriented at an oblique angle to the wedge face, and
the first and second wedge sides including bearing pads.

14. The gauging station as recited in claim 13, wherein the male wedge is on a base surface located opposite the wedge face, wherein there are first and second elongated slots, the first elongated slot extending along a first corner between the base surface and the first wedge side and the second elongated slot extending along a second corner between the base surface and the second wedge side.

15. The gauging station as recited in claim 13, wherein the leading wedge side bears against the leading slot side.

16. A gauging station comprising:
a substrate plate;
a fixture plate secured on the substrate plate, the fixture plate having a first mounting member;
a gauging fixture having a second mounting member that is interlockable with the first mounting member to secure the gauging fixture on the fixture plate,
wherein one of the first mounting member or the second mounting member is a male wedge and the other of the first mounting member or the second mounting member is a female wedge slot that is complementary to the male wedge,
wherein the male wedge includes a wedge face, first and second wedge sides oriented at an acute angle to each other, and a leading wedge side joining the first and second wedge sides, the first and second wedge sides being oriented at an oblique angle to the wedge face, the male wedge being on a base surface located opposite the wedge face, and
there are first and second elongated slots, the first elongated slot extending along a first corner between the base surface and the first wedge side and the second elongated slot extending along a second corner between the base surface and the second wedge side.

* * * * *